(12) United States Patent
Velusamy et al.

(10) Patent No.: US 11,650,309 B2
(45) Date of Patent: May 16, 2023

(54) LOW-POWER VEHICLE SENTINEL SYSTEMS AND METHODS

(71) Applicant: Ford Global Technologies, LLC, Dearborn, MI (US)

(72) Inventors: Sai Prasanth Velusamy, Westland, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 17/144,678

(22) Filed: Jan. 8, 2021

(65) Prior Publication Data

US 2022/0221575 A1 Jul. 14, 2022

(51) Int. Cl.
| | |
|---|---|
| *G01S 13/88* | (2006.01) |
| *B60R 25/40* | (2013.01) |
| *H04W 4/12* | (2009.01) |
| *G08B 21/00* | (2006.01) |
| *B60R 25/30* | (2013.01) |
| *G06V 20/40* | (2022.01) |
| *G06V 20/56* | (2022.01) |
| *G06F 18/24* | (2023.01) |
| *H04N 23/60* | (2023.01) |

(52) U.S. Cl.
CPC .......... *G01S 13/886* (2013.01); *B60R 25/305* (2013.01); *B60R 25/40* (2013.01); *G06F 18/24* (2023.01); *G06V 20/41* (2022.01); *G06V 20/56* (2022.01); *G08B 21/00* (2013.01); *H04N 23/60* (2023.01); *H04W 4/12* (2013.01)

(58) Field of Classification Search
None
See application file for complete search history.

(56) References Cited

U.S. PATENT DOCUMENTS

| | | | |
|---|---|---|---|
| 9,452,732 B1 * | 9/2016 | Hermann | ................ B60R 25/31 |
| 9,848,114 B2 | 12/2017 | Boudreau et al. | |
| 11,433,855 B2 * | 9/2022 | Bielby | .................... G06V 10/82 |
| 2012/0092129 A1 * | 4/2012 | Lickfelt | ................. B60R 25/24 |
| | | | 340/5.72 |

(Continued)

FOREIGN PATENT DOCUMENTS

| | | | | |
|---|---|---|---|---|
| AU | 2013211563 A1 * | 3/2014 | ............. | G08B 13/22 |
| CA | 2640865 A1 * | 4/2009 | ......... | B01D 53/8687 |

(Continued)

OTHER PUBLICATIONS

Solic et al, "Smart Parking Sensor Performance Evaluation", Sep. 2019, 6 pages.

(Continued)

*Primary Examiner* — Fekadeselassie Girma
(74) *Attorney, Agent, or Firm* — Frank Lollo; Eversheds Sutherland (US) LLP

(57) ABSTRACT

Low-power vehicle sentinel systems and methods are disclosed herein. An example method includes obtaining electromagnetic signals in a target area surrounding a vehicle. The electromagnetic signals can be obtained from electromagnetic elements mounted to the vehicle. The method can include determining attributes or behaviors of an object in the target area based on the electromagnetic signals and executing a response measure based on the attributes or behaviors of the object.

19 Claims, 3 Drawing Sheets

(56) References Cited

U.S. PATENT DOCUMENTS

| | | | |
|---|---|---|---|
| 2017/0296965 A1* | 10/2017 | Schaeffer | B64D 37/32 |
| 2019/0031101 A1* | 1/2019 | Yousefian | G06T 11/60 |
| 2019/0098200 A1 | 3/2019 | Boudreau et al. | |
| 2021/0026753 A1* | 1/2021 | Krebs | G06N 20/00 |
| 2021/0284100 A1* | 9/2021 | Adusumalli | B60R 25/34 |

FOREIGN PATENT DOCUMENTS

| | | | | |
|---|---|---|---|---|
| CN | 102104435 A * | 6/2011 | | B60R 25/245 |
| DE | 102016105396 A1 * | 10/2016 | | B60R 25/10 |
| JP | 3603018 B2 * | 12/2004 | | |
| JP | 3822417 B2 * | 9/2006 | | |
| WO | WO-02069301 A2 * | 9/2002 | | B60W 30/16 |
| WO | WO-2014160372 A1 * | 10/2014 | | G01S 11/06 |

OTHER PUBLICATIONS

Nissan Motor Corporation, "Multi-Sensing System With Front Camera", 2 pages.

\* cited by examiner

LOW-POWER VEHICLE SENTINEL SYSTEMS AND METHODS

BACKGROUND

Current trends of vehicle vandalism are on the rise. The fear of parking and leaving a vehicle unattended (or leaving valuable items in a vehicle) in an unknown or remote location are high for a vehicle owner. Some current and future generations of vehicles may be equipped with multiple internal and/or external cameras. Conceptually, a sentinel system utilizes existing vehicle cameras to monitor vehicle surroundings. Some forms of vehicle monitoring may involve cyclic wake up of exterior cameras in a vehicle or third-party cameras (non-integrated) mounted in the vehicle. These solutions can rapidly deplete vehicle energy by frequently waking up, recording video streams from all the exterior cameras, transferring data to memory, and using recording functions.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to low-power vehicle sentinel systems and methods. Example vehicle sentinel systems of the present disclosure can be used to identify and record potential threats to a vehicle. Some systems of the present disclosure include a sentinel system integrated into a vehicle. The sentinel system can include ultra-low power electromagnetic strips that emit a range of electromagnetic radiation at predefined distance(s) around an outer perimeter of the vehicle. External cameras can be activated (e.g., wake-up) by the sentinel system to record information based on electromagnetic disturbances detected using the electromagnetic strips. Using the strips and the electromagnetic field generated around the vehicle, the sentinel system of the vehicle may be able to identify a direction of approach of a threat and a size of the threat, and may be able to selectively wake-up only cameras facing that particular direction. Additionally, the sentinel system can be configured to enable geo-tagging of vehicle location to enable optimization of recording frequencies, scene segmentation parameters, and inferences of the sentinel system—just to name a few.

The electromagnetic field around the vehicle can be partitioned into various zones such as an interference zone, a threat zone, and a warning zone, each having a different range from the vehicle. Different remediating actions or responses may be taken by the sentinel system depending on which region the threat is identified in. For example, if the threat is identified in the interference region (the region that is the greatest distance from the vehicle), a camera on that side of the vehicle can be woken up to perform image analysis and obtain an image. If a threat is identified in the threat region (mid-range region), then video recording can be automatically triggered. If the threat is detected in the warning region (closest region to the vehicle), then recording may be performed in parallel with motion sensing and image classification, and a warning may be sent to a recipient, such as a vehicle occupant.

ILLUSTRATIVE EMBODIMENTS

Figure 1:
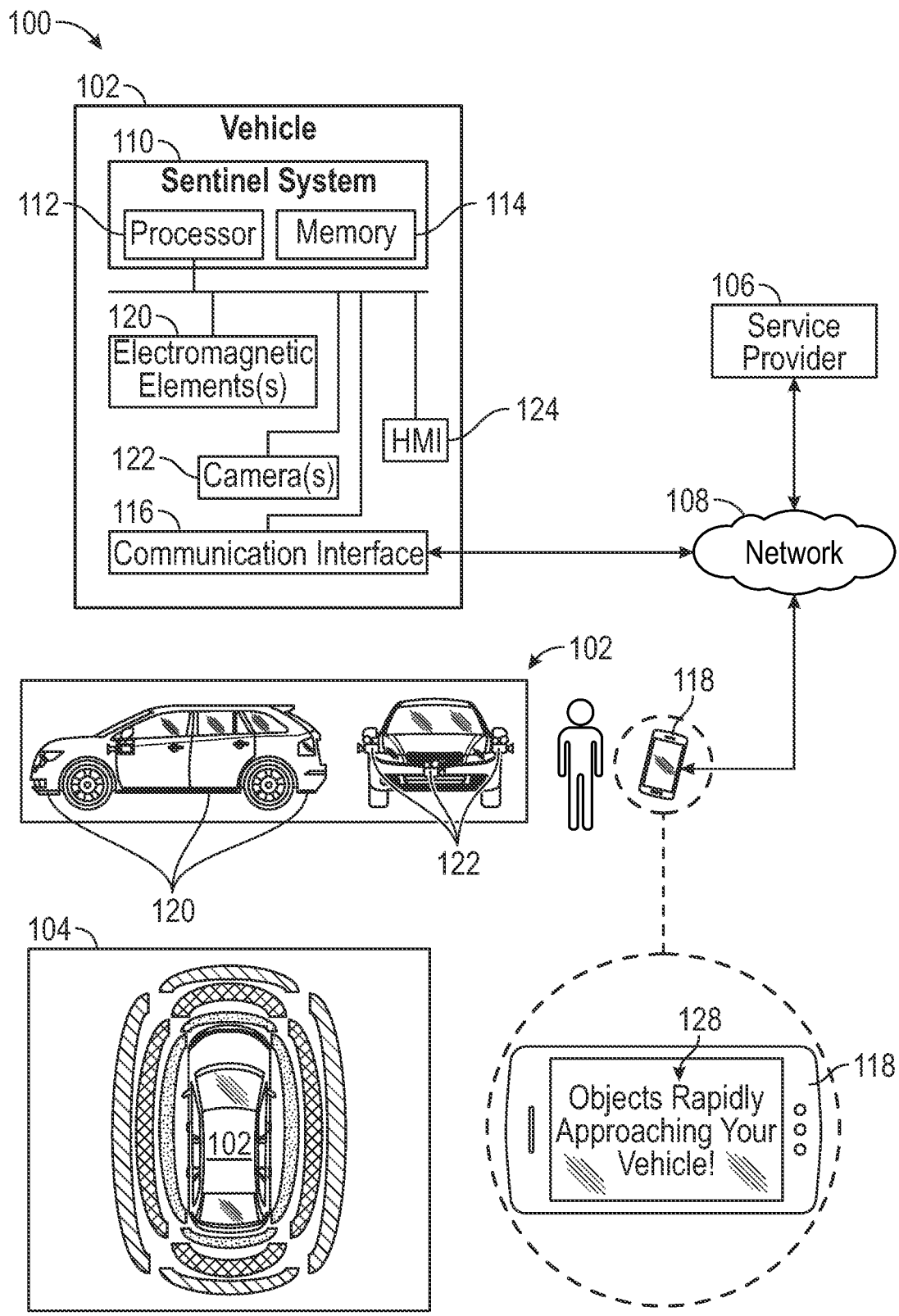
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can include a vehicle 102 within an operating environment 104, as well as a service provider 106. Each of these components in the architecture 100 can communicate using the network 108. The network 108 can include combinations of networks that enable the components in the architecture 100 to communicate with one another. The network 108 may include any one or a combination of multiple different types of networks, such as cable networks, the Internet, wireless networks, and other private and/or public networks. In some instances, the network 108 may include cellular, Wi-Fi, or Wi-Fi direct. In general, the operating environment 104 can include any location, such as a parking lot, where the vehicle may be parked and left unattended.

Generally, the vehicle 102 can comprise a sentinel system 110 having a processor 112 and memory 114. The processor 112 executes instructions included in the memory 114 to perform functions or operations in accordance with the present disclosure, such as sentinel monitoring and response management. In one configuration, the sentinel system 110 can communicate over the network 108 using a communications interface 116.

The sentinel system 110 can evaluate threats around the vehicle 102 using empirical electromagnetic spectrum data as a trigger to identify object attributes or behaviors such as a direction of approach, presence, and size of threat. The electromagnetic spectrum data can be used to trigger or wake up one or more camera to record images/video under defined operational criteria.

The vehicle can be equipped with cameras to obtain a surround view (or at least partial) of the vehicle. When potential threat is detected, the cameras can be activated to record the scene around the vehicle, store any images/video, and transfer them to the service provider and the user (such as a mobile device 118). Geo-tagging of images with data such as vehicle location data may be used to optimize recording frequencies, scene segmentation parameters, and inference of the integrated sentinel system. The cameras may be activated based on certain input such as a trigger. An example trigger can include EM (electromagnetic) disturbances. These sentinel systems can monitor the vehicle's surroundings for the presence of a threat and record images provided any pre-defined conditions are met.

Thus, the sentinel system 110 uses a combination of EM disturbances, image processing, motion sensing, cloud (e.g., service provider 106) and on-board data management to monitor vehicle surroundings. The sentinel system 110 can also implement methods to optimize the selective wake up of camera(s) based on output obtained from low power consuming EM strips. Activation of the sentinel system 110 and monitoring a target area around the vehicle can be triggered when the vehicle 102 is parked and/or when the ignition or engine of the vehicle 102 is off. A user can also enable the sentinel system 110 through an application that is executed by the mobile device 118. The sentinel system 110 can receive an indication that the engine or ignition of the vehicle is off from another vehicle sensing platform or controller (not shown).

The vehicle 102 can comprise one or more electromagnetic elements, such as electromagnetic element 120, as well as one or more cameras, such as a camera 122. The electromagnetic element 120 can include a strip or sections of strips that are located on an exterior surface of the vehicle 102. The number, shape, size, and placement of the one or more electromagnetic elements can vary according to vehicle or other design criteria. In one example, the vehicle 102 includes electromagnetic elements that extend along both the left side and right sides of the vehicle 102, below the vehicle doors. Other electromagnetic elements can be associated with the front and rear bumpers. However, the number and location of the one or more electromagnetic elements on the vehicle 102 may be dictated, for example, by a sensing range or sensing field of the one or more electromagnetic elements. The electromagnetic element 120 can include an ultra-low power electromagnetic strip such as those used in antennas. The electromagnetic element 120 can be configured to emit a definitive range of electromagnetic radiation over a predefined distance, which may be subjected to spatial partitioning as example operational criteria.

The one or more electromagnetic elements can be electrically and/or communicatively coupled to the sentinel system 110. The sentinel system 110 can activate, deactivate, and receive signals/data from the one or more electromagnetic elements that are utilize to monitor a perimeter around the vehicle 102, as will be discussed in greater detail infra. The sentinel system 110 can also selective activate and/or deactivate the camera 122 to obtain images in response to perimeter monitoring using the one or more electromagnetic elements, as will be discussed in greater detail infra. A magnitude of the EM signals can be used to determine an appropriate response by the sentinel system 110, such as activating the camera 122 to obtain images, obtain video, transmitting a warning message, and/or activating other vehicle responses such as illuminating vehicle lights, a horn, or other similar response(s).

The number and location of cameras on the vehicle 102 can be dictated by the field of view of the cameras, for example. In one use case, the vehicle 102 possesses a number of cameras to obtain images of the perimeter around the vehicle that is being monitored with the one or more electromagnetic elements. For example, the cameras can obtain images within a perimeter around the vehicle 102. An example sentinel perimeter around a vehicle is illustrated and described in FIG. 2. Vehicle cameras can have fields of view that may overlap in some instances. In general, the camera 122 can be activated as a response measure, based on EM signals output by the electromagnetic element 120. As noted above, the type of response measure selected can be based on a magnitude of the EM signals that are indicative of how close a threat is to the vehicle, and/or how quickly a perceived threat is approaching the vehicle 102.

Figure 2:
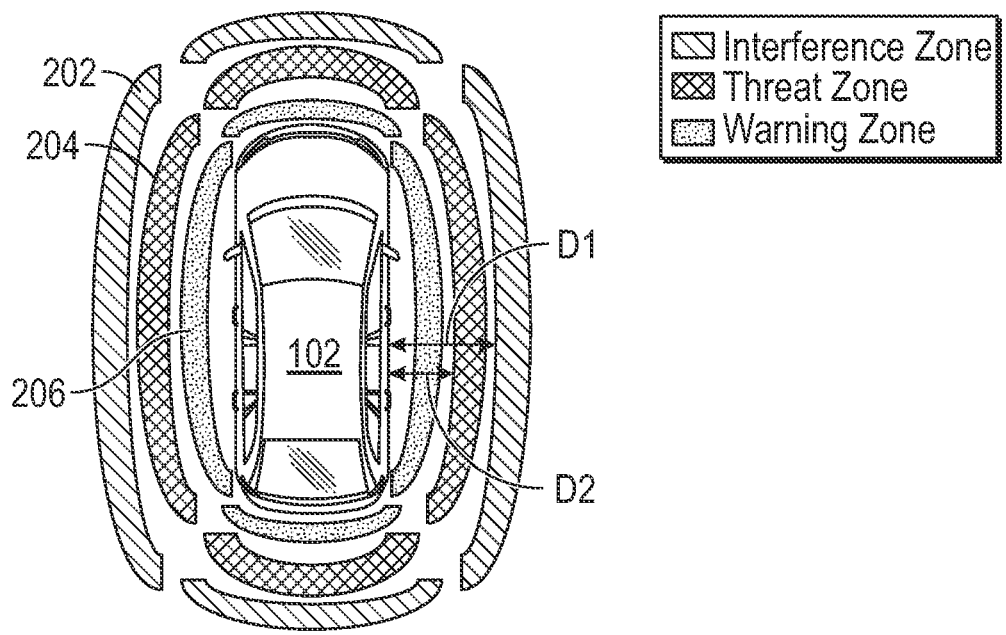
FIG. 2 depicts an example scenario that illustrates a target area that is subdivided into zones.
Figure 2:
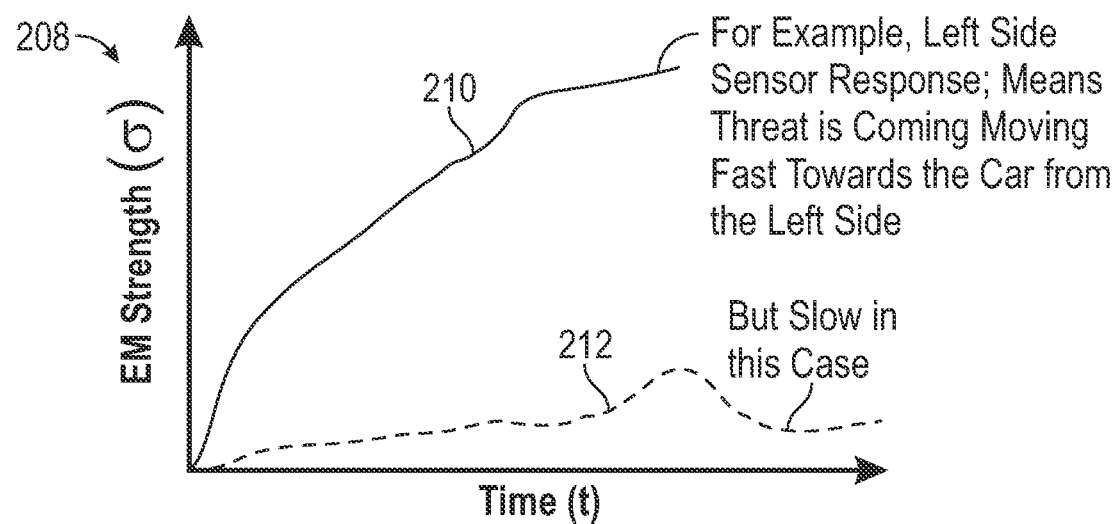

Referring now to FIGS. 1 and 2 collectively, the electromagnetic elements on the vehicle 102 can be used to establish various zones around a perimeter of the vehicle 102. For example, a first zone 202, referred to as an interference zone, may include a first area spaced away from the vehicle at a first distance D1. The interference zone has a width dimension that is selectable and configurable. A second zone 204, referred to as a threat zone, may include a second area spaced away from the vehicle at a second distance D2. The threat zone also has a width dimension that is selectable and configurable. A third zone 206, referred to as a warning zone, may include a third area spaced away from the vehicle at a third distance. The warning zone also has a width dimension that is selectable and configurable.

In general, the first, second and third zones are arranged as concentric rings around the perimeter of the vehicle 102, with the third zone 206 being closest to the vehicle 102 and the second zone 204 being located between the third zone 206 and the first zone 202. To be sure the first zone 202 is located the furthest away from the vehicle 102. Each of these zones can be associated with a unique response by the sentinel system 110. That is, a response measure for a zone can varies according to parameters established for each of the zones. For example, a first zone can have parameters such as activation of a camera to obtain images, while a second zone can have parameters such as activation of a camera to obtain images, in combination with transmission of a warning message.

As noted above, each of the electromagnetic strips (EM) may emit EM radiation of certain wavelength. The sentinel system 110 functions based on the EM wave principles such as time of flight to identify an object (e.g., threat) in its flight path. The sentinel system 110 can partition a distribution space around the vehicle as interference region, threat region and warning region (e.g., first, second, and third zones).

Regions where the EM field is supposed to have a strength value of σ, whenever the object is moving in the field there may be a rate of change of field strength σ̇, which is the base measure for the sentinel system 110 to trigger a response. There is a constant object in the EM field, the strength value might be Δσ derived based on the base strength of EM field value of σ where a rate of change of field strength:

$$\dot{\sigma} = \frac{d\sigma}{dt}$$

and Δσ is the EM strength value.

The operational inferences are if the rate of change of field strength σ̇, indicated an object in motion around the field, and field value of Δσ indicates the presence of a constant object in the field. But whenever there is a disturbance determined by the sentinel system 110, the sentinel system 110 can trigger a camera to wake up. FIG. 2 also illustrates an example graph 208 of EM strength versus time. A first sensing event is illustrated on line 210, and a second sensing event is illustrated as line 212. The line 210 is indicative of a potential threat approaching from a side of the vehicle. The object/threat is approaching at a rapid rate towards (e.g., velocity of approach) the vehicle. Line 204 indicates a potential threat that is moving towards the vehicle at a slow pace.

Operational modes may depend on various methods. For example, operational modes can be based on an interference region, which can correspond to the first zone 202. Generally, an interference region is a sensing region, where an object is not at very close proximity to the vehicle, and may be at a far end of the EM range. Interference in the EM radiation identifies or is indicative of the presence of an object. This interference can be sensed by the sentinel system 110, which then wakes up a camera on that side of the vehicle to monitor and perform image analysis of the object present and classify the object as a potential threat or noise. The camera can obtain a picture of the object in scene and retain a copy in vehicle storage (memory 114) or at service provider 106.

A threat region or zone exists in the middle of EM range and closer to the vehicle, and roughly corresponds to the second zone 204. In this region, as soon as the presence of an object is identified, the sentinel system 110 can awake a camera associated with the area where the object has been identified. The sentinel system 110 can perform motion sensing to classify an action or behavior of the object. If the action is identified to be threat to vehicle, the sentinel system 110 can immediately trigger video recording. The recorded video may be stored on board the vehicle and/or at the service provider 106. The sentinel system 110 can also obtain images to retain that record the potential threat/object.

The warning region or zone is the closest proximity zone to the vehicle, and corresponds to the third zone 206. This region is potentially a sensitive region where any threat to vehicle could easily happen. As soon as the sentinel system 110 senses the presence of an object detection in the third zone 206 based on the EM signals, the sentinel system 110 can activate a camera and recording is initiated, and motion sensing/image classification are performed by the sentinel system 110 in parallel to have record of the threat. Additionally, there can be a message or warning to the vehicle user via the service provider 106 to the mobile device 118 or a human machine interface (HMI) 124 of the vehicle indicating an imminent threat to the vehicle. An example of an HMI includes an infotainment system or other digital display of the vehicle 102.

The warning or message can be triggered and displayed at the vehicle level without use of the service provider 106. An example warning message 128 is illustrated on the mobile device 118. When the vehicle and the mobile device are in communication proximity to one another the warning or message could be delivered over a short-range wireless protocol. To be sure, while three zones are illustrated and described, fewer or additional zones can be included. In general, the warning zone is closest to the vehicle, the threat zone extends beyond an outer edge of the warning zone, and the interference zone extends beyond an outer edge of the threat zone. These zones are arranged concentrically in some instances.

As noted above, the sentinel system 110 can be configured to geo-tag collected vehicle data, such as EM signals, threat assessment evaluations, response measures, and so forth. These location data can also be used to allow the service provider, a user, or other recipient to identify vehicle location and sentinel data.

Figure 3:
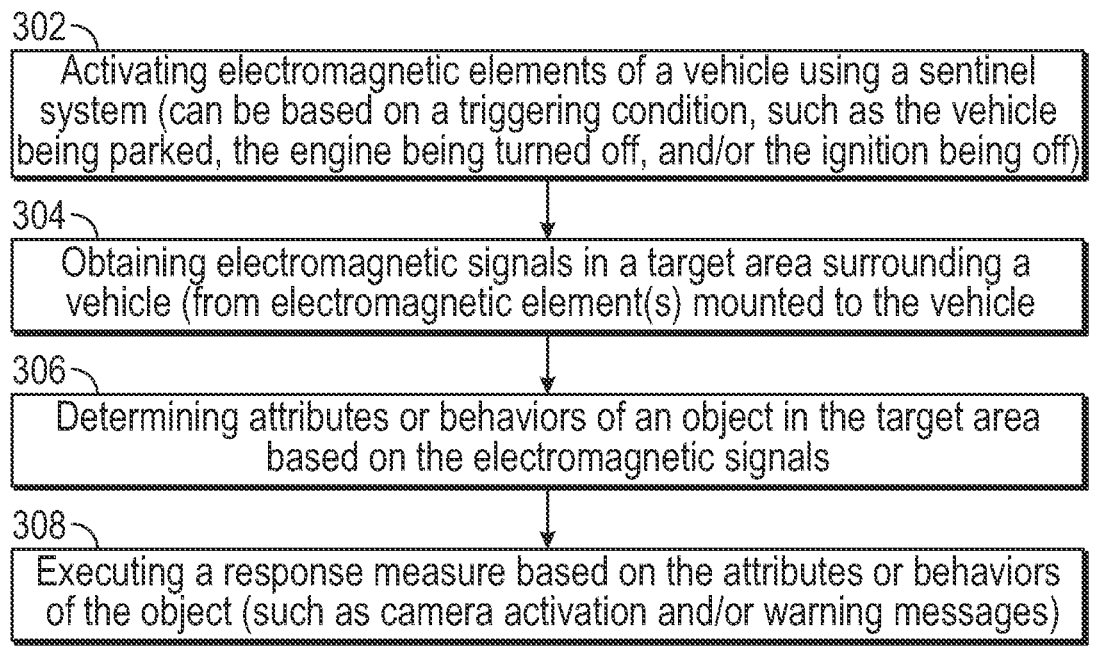
FIG. 3 is a flowchart of an example method of the present disclosure.

FIG. 3 is a flowchart of an example method of the present disclosure. The method can include a step 302 of activating electromagnetic elements of a vehicle using a sentinel system. The activation of the electromagnetic elements can be based on a triggering condition, such as the vehicle being parked, the engine being turned off, and/or the ignition being off. The electromagnetic elements can include ultra-low power elements that have reduced energy consumption.

The method can include a step 304 of obtaining electromagnetic signals in a target area surrounding a vehicle. To be sure, the electromagnetic signals are obtained from electromagnetic elements mounted to the vehicle. The method can also include a step 306 of determining attributes or behaviors of an object in the target area based on the electromagnetic signals. These attributes or behaviors can include, but are not limited to, presence, direction of approach, velocity of approach, and size of the object. The method can include a step 308 of executing a response measure based on the attributes or behaviors of the object.

The response measure can include activating a camera to obtain images or video of the object. These images or video can be geo-tagged in some instances. The images or video can be stored at the vehicle level, and/or a service provider level. The object can also be classified based on an analysis of the images or the video. For example, image processing can be performed to identify size, shape, color, facial features, and so forth. Classification can also correspond to a threat type or level. For example, the object can be classified as a higher threat if it is approaching at a high rate of speed, or if the object is within a warning zone of the target area. As noted above, the cameras may be activated in response to certain attributes or behaviors of the object to ensure that the cameras are not contributing to excess energy consumption, as would be the case if the cameras were run continuously.

Figure 4:
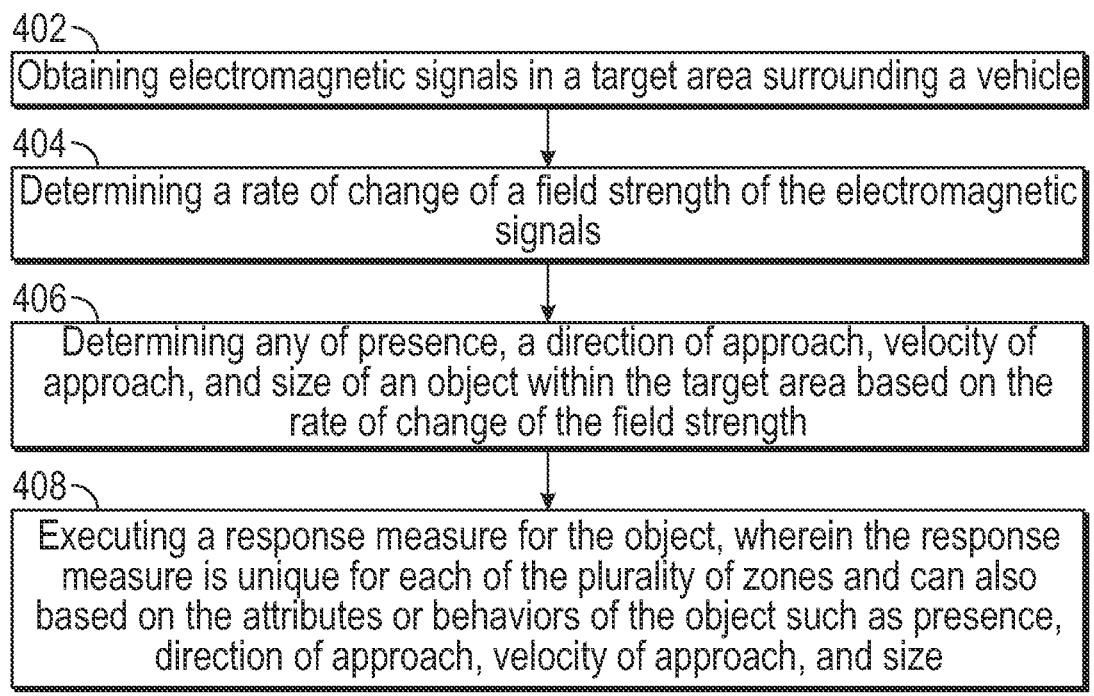
FIG. 4 is a flowchart of another example method of the present disclosure.

FIG. 4 is a flowchart of an example method. The method can include a step 402 of obtaining electromagnetic signals in a target area surrounding a vehicle. Again, the electromagnetic signals can be obtained from an electromagnetic element mounted to the vehicle. This can include EM strips that at least partially surround the vehicle.

The method can include a step 404 of determining a rate of change of a field strength of the electromagnetic signals, as well as a step 406 of determining any of presence, a direction of approach, velocity of approach, and size of an object within the target area based on the rate of change of the field strength. The method can include a step 408 of executing a response measure for the object, wherein the response measure is unique for each of the plurality of zones and can also based on the attributes or behaviors of the object such as presence, direction of approach, velocity of approach, and size—just to name a few.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
obtaining electromagnetic signals in a target area surrounding a vehicle, the electromagnetic signals being obtained from electromagnetic elements mounted to the vehicle, wherein the target area includes a first concentric zone, a second concentric zone, and a third concentric zone, wherein the second concentric zone is a greater distance from the vehicle than the first concentric zone, and wherein the third concentric zone is a greater distance from the vehicle than the second concentric zone;
determining attributes or behaviors of an object in the target area based on the electromagnetic signals;
determining a threat type or level of the object based on the attributes or behaviors of the object;
executing a first type of response measure based on the threat type or level of the object and a first determination that the object is located in the first concentric zone;
executing a second type of response measure based on the threat type or level of the object and a second determination that the object is located in the second concentric zone, wherein the second type of response measure is different than the first type of response measure; and
executing a third type of response measure based on the threat type or level of the object and a third determination that the object is located in the third concentric zone, wherein the third type of response measure is different than the first type of response measure and the second type of response measure.

2. The method according to claim 1, wherein the first determination and the second determination each include the third determination, and wherein the third type of response measure includes activating a camera of the vehicle to obtain images or video of the object.

3. The method according to claim 2, further comprising geo-tagging the images or video of the object with a location of the vehicle, wherein executing the first type of response measure or the second type of response measure is further based on the geo-tagging.

4. The method according to claim 2, further comprising determining a classification of the object based on an analysis of the images or the video, wherein determining the threat type or level of the object is further based on the classification of the object.

5. The method according to claim 1, wherein a first size of the first concentric zone, a second size of the second concentric zone, and a third size of the third concentric zone are selectable and configurable.

6. The method of claim 1, wherein the third type of response measure comprises activating a camera of the vehicle, wherein the second type of response measure comprises automatically initiating video recording, and wherein the first type of response measure comprises performing motion sensing and image classification and transmitting a warning to a remote device.

7. The method of claim 1, wherein the attributes or behaviors of the object include a presence of the object, a size of the object, an approach direction of the object, and an approach velocity of the object.

8. A vehicle, comprising:
an electromagnetic element associated with an outer surface of the vehicle;
a camera associated with the vehicle; and
a sentinel system comprising a processor and memory, the processor executing instructions stored in the memory to:
determine attributes or behaviors of an object in a target area for the vehicle based on electromagnetic signals received from the electromagnetic element, wherein the attributes or behaviors include a presence of the object in the target area, wherein the target area includes a first concentric zone, a second concentric zone, and a third concentric zone, wherein the second concentric zone is a greater distance from the vehicle than the first concentric zone, and wherein the third concentric zone is a greater distance from the vehicle than the second concentric zone;
determine a threat type or level of the object based on the attributes or behaviors of the object;
execute a first type of response measure based on the threat type or level of the object and a first determination that the object is located in the first concentric zone;
execute a second type of response measure based on the threat type or level of the object and a second determination that the object is located in the second concentric zone, wherein the second type of response measure is different than the first type of response measure; and
execute a third type of response measure based on the threat type or level of the object and a third determination that the object is located in the third concentric zone, wherein the third type of response measure is different than the first type of response measure and the second type of response measure.

9. The vehicle according to claim 8, further comprising additional electromagnetic elements and additional cameras that are placed around an outer perimeter of the vehicle.

10. The vehicle according to claim 9, wherein the attributes or behaviors of the object further include an approach direction of the object, and wherein the processor is configured to select the camera or one of the additional cameras based on the approach direction of the object.

11. The vehicle according to claim 8, wherein the processor is configured to activate the electromagnetic element when the vehicle is parked or an ignition of the vehicle is off.

12. The vehicle according to claim 8, wherein the first determination and the second determination each include the third determination, and wherein the processor is configured to activate the camera to obtain images or video of the object as the third type of response measure.

13. The vehicle according to claim 12, wherein the processor is configured to determine a classification of the object based on an analysis of the images or the video, and wherein determining the threat type or level of the object is further based on the classification of the object.

14. The vehicle according to claim 8, wherein the electromagnetic element is an ultra-low-power electromagnetic strip.

15. A device, comprising:
a processor; and
a memory for storing instructions, the processor executing the instructions to:
obtain electromagnetic signals in a target area surrounding a vehicle, the electromagnetic signals being obtained from an electromagnetic element mounted to the vehicle, wherein the target area includes a first concentric zone, a second concentric zone, and a third concentric zone, wherein the second concentric zone is a greater distance from the vehicle than the first concentric zone, and wherein the third concentric zone is a greater distance from the vehicle than the second concentric zone;

determine a rate of change of a field strength of the electromagnetic signals;

determine any of a presence of an object, a direction of approach of the object, a velocity of approach of the object, and a size of the object within the target area based on the rate of change of the field strength;

determine that the object is located in the first concentric zone, the second concentric zone, or the third concentric zone;

determine a threat type or level of the object based on the determination that the object is located in the first concentric zone, the second concentric zone, or the third concentric zone and at least one of the presence of the object, the direction of approach of the object, the velocity of approach of the object, and the size of the object;

execute a first type of response measure for the object based on the threat type or level of the object and a first determination that the object is located in the first concentric zone;

execute a second type of response measure based on the threat type or level of the object and a second determination that the object is located in the second concentric zone, wherein the second type of response measure is different than the first type of response measure; and execute a third type of response measure based on the threat type or level of the object and a third determination that the object is located in the third concentric zone, wherein the third type of response measure is different than the first type of response measure and the second type of response measure.

16. The device according to claim 15, wherein the target area is divided into a plurality of zones that comprise an interference zone, a threat zone, and a warning zone, with the warning zone being closest to the vehicle, the threat zone extending beyond the warning zone, and the interference zone extending beyond the threat zone.

17. The device according to claim 16, wherein the plurality of zones are concentrically arranged.

18. The device according to claim 15, wherein the processor is configured to activate the electromagnetic element when the vehicle is parked or an ignition of the vehicle is off.

19. The device according to claim 15, wherein the processor is configured to classify the object based on an analysis of images or video obtained of the object as at least a part of the first type of response measure or the second type of response measure.

* * * * *